Figure 1:
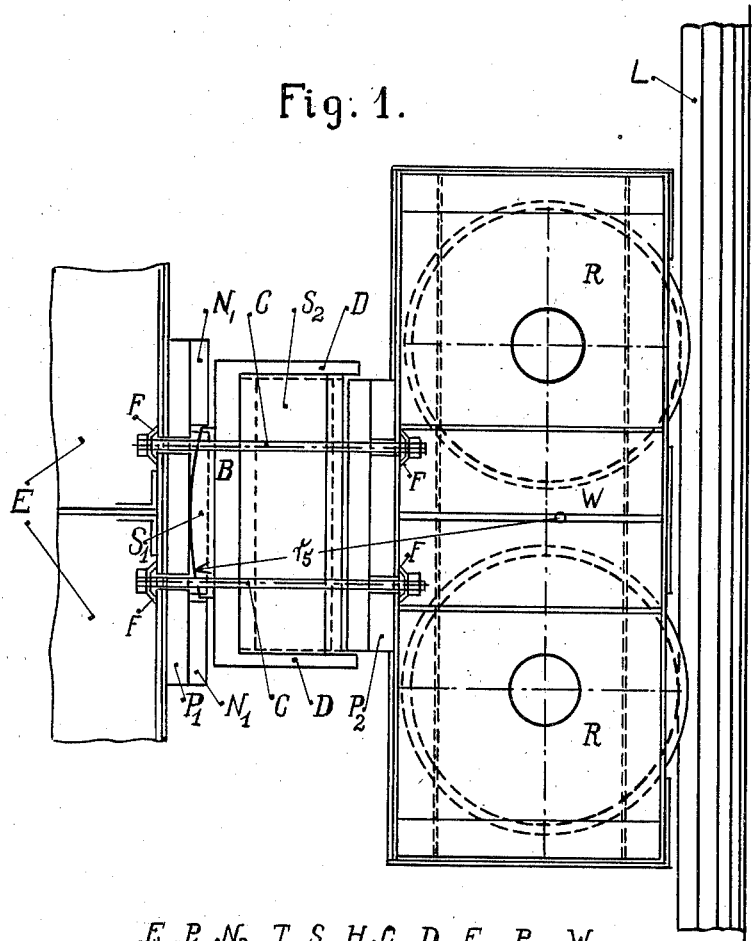

Dec. 6, 1938. P. CICIN 2,139,488
ROLLER SLUICE BEARING STRUCTURE
Filed July 3, 1937 2 Sheets-Sheet 2

Inventor:
Paul Cicin

Patented Dec. 6, 1938

2,139,488

UNITED STATES PATENT OFFICE 2,139,488

ROLLER SLUICE BEARING STRUCTURE

Paul Cicin, Vienna, Austria

Application July 3, 1937, Serial No. 151,828
In Austria July 14, 1936

3 Claims. (Cl. 61—28)

Bearing structures for comparatively large-sized roller sluices of weirs in pier niches must be able to answer several requirements as to their movability. First of all, the bearing structure must permit the variations in length of the closing body due to the variations of the temperature, as well as the variations of the ends of the closing body and the distortions of the same, as due to the load. Besides, in those cases, in which the sluice is supported on more than two rolls lying over one another the point must be considered that the running-rolls—which, especially in the case of large-sized closures are composed of comparatively short pieces—do not lie accurately in a straight line and have unevennesses which the rolls of the supporting structure must be able to overcome without a change in the distribution of the load.

Those requirements which are due to the load and the variations of the temperature are responded to in known manner by supporting the sluice on rolls comprised in pairs in a roll carriage, and by inserting between the roll carriage and the end frame supporting bodies able to permit shifting, as well as turning of the sluice ends. The movability of the running pair of rolls in the plane of the rolls as aimed at in order to obtain, by the use of two such rolls in a common carriage, compensation of the unevennesses in the rail is obtained, however, only in a very deficient manner. The high bearing pressure to be transmitted necessitates also a considerable length of the supporting bodies so that a turning movement in the plane of the running rolls would require a tilting movement of the supporting bodies on an edge. In order to diminish this drawback (tilting on an edge) the supporting body is chosen as short as possible. A short length of the supporting body necessitates, however, a longer radius of curvature of the contacting surfaces which entails the consequence that the entire construction does not constitute an arrangement and combination of parts unobjectionable in every respect.

In order to obviate the above-mentioned drawbacks, it has already been proposed to insert in known manner a diagonal joint between the roll carriage and the sluice end frame, but then the constructional height becomes inadmissibly great and the obtainment of a connection between the roll carriage and the sluice end frame is rendered considerably difficult.

The object of the present invention is, while maintaining all requirements as to movability, to present a roller-sluice bearing structure which in spite of obviating sliding friction has only a slight constructional height and constitutes a simple and secure connection between the roll carriage and the sluice frame. This object is, according to this invention, obtained as follows:

Between the bearing body serving for the longitudinal movableness of the sluice and one of two abutment plates or, more precisely, pressure-transmitting abutment plates is inserted a box-like body which is open on the side located at the plate serving as abutment for said bearing body and which extends in the longitudinal direction of this body, said box receiving the said bearing body within its interior and the bottom of the said box serving as an abutment for that bearing body or member. The outer face of the box-like body is of convex shape and the axis of the convex curve stands perpendicularly with respect to the axis of the bearing member in said body. Because of the comparatively slight thickness of the said box-like body the increase of the constructional height relatively to the known bearing structure is only slight. The uniform transmission of the pressure between the bearing member and the box bottom is warranted by the feature that the bottom is stiffened or reinforced by webs arranged at both sides of the bearing member, and by covers provided on the frontal ends. Said webs and covers are reinforced by flanges. The reaction of the running path is effected by letting the covers extend beyond the pressure-transmitting abutment plates.

As distinguished from the known arrangement the present improved one presents the further advantage that now the bearing bodies can have a considerable length and can, therefore, be made of a cylinder with circular transverse section without a displacement of the centre of curvature. It is possible to make use of a roll instead of the bearing member, but then the box must have a larger breadth.

Figure 2:
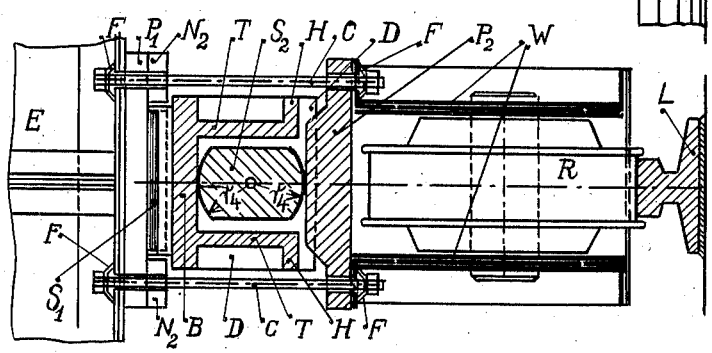
Figure 3:
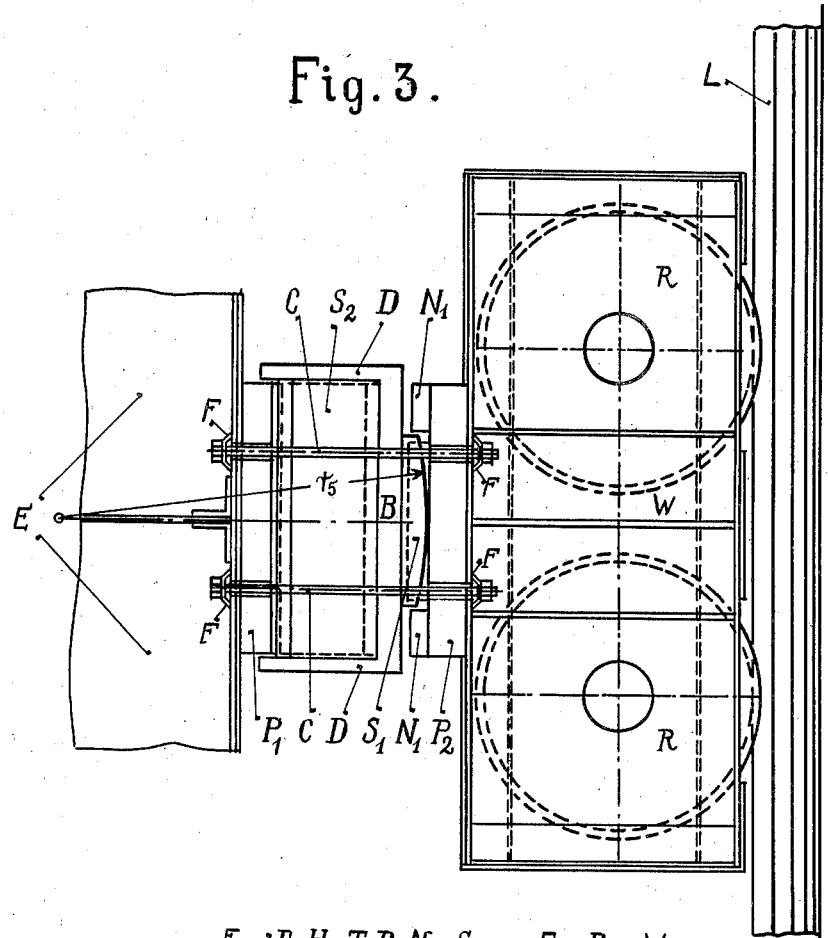
Figure 4:
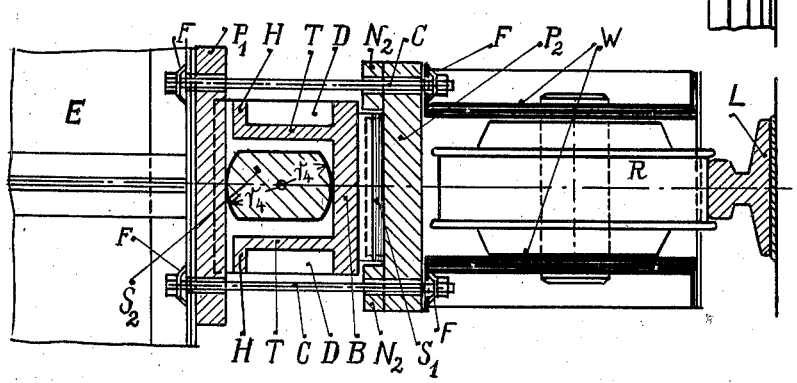

The invention is illustrated diagrammatically and by way of example on the accompanying drawings on which Figure 1 is a side-view of a roller-sluice bearing structure designed according to this invention, and Figure 2 is a horizontal transverse section through the same, the section being taken between the two flanged running rolls R to be seen in the right-hand half of Fig. 1. Figs. 3 and 4 show a modification.

The bearing pressure exerted by the end frame E is transmitted to the convex face $S_1$ of the box bottom B by means of the pressure-transmitting plate $P_1$. The inner surface of the box bottom B transmits the pressure further to the bearing member $S_2$, the tilting direction of which extends perpendicularly with respect to the tilting direction of the plate $S_1$. The member $S_2$ in its turn transmits the pressure further to the pressure-transmitting abutment plate $P_2$ attached to the roll carriage W. In order to stiffen the box bottom B the webs T are provided which are arranged at both sides of the bearing member $S_2$, and furthermore the covers D are provided which close the box at its upper and its lower end. The webs T are reinforced by the flanges H. The box-like body formed by the bottom B, the webs T and the flanges H is highly bending-proof and ensures a uniform transmission of the pressure between the bearing member $S_2$ and the box bottom B. The covers D, in turn, secure the co-action of the box when the pressure is transmitted in the direction of the running path and increase directly the stiffness of the plate.

For working reasons the covers may, after the inner surface of the bottom B has been planed, be jointed to the other portions of the box, for instance by welding; and by letting the covers D extend over the plate $P_2$ the longitudinal forces can be transmitted between the roll carriage W and the box enclosing the bearing member $S_2$. The dogs $N_1$ and $N_2$ attached to the plate $P_1$ effect a connection between the box and the end frame of the sluice roller. The momentum produced when the force arising at the end-frame is transmitted at the place of contact between the rail L and the rolls R is taken up by the screw-bolts C which connect the sluice and the roll carriage with one another by means of the springs F. The supporting or bearing member $S_2$ is cut out of a cylinder having a circular transverse section with the radius $r_4$ (Fig. 2). The radius $r_5$ (Fig. 1) of the pressure-transmitting plate $S_1$ can be chosen sufficiently long with proper consideration of the reaction at the abutments.

The same result can be obtained by reversing the arrangement of certain parts, viz by letting the bearing member $S_2$ contact with the pressure-transmitting abutment plate $P_1$ located at the sluice end frame, and by letting the convex outer bottom surface of the box contact with the roll carriage, as is shown in the Figures 3 and 4. This result is obtained by the fact that the members $S_1$, B, T, H, and $S_2$ are turned 180 degrees. Finally, it is possible to let the covers D extend over the plate $P_1$ or over the plate $P_2$ or over both these plates, the dogs $N_1$ being omitted in the first of these cases.

I claim:

1. In a bearing structure for a roller sluice, in combination with the end-frame thereof, the roll-carriage and an abutment-plate secured thereto, a box-like body open at one end, a pressure-transmitting abutment member having opposed curved bearing faces being disposed within said box-like body and bearing with its one curved bearing face against said abutment-plate and with its other curved bearing face against the plane inner bottom surface of said box-like body, and an intermediate pressure transmitting plate secured to said end frame and bearing against a convex surface provided on the outside of the bottom of said box-like body.

2. The combination as specified in claim 1, in which the axis of the convex surface provided on the outside of the bottom of said box-like body lies in a horizontal plane.

3. The combination as specified in claim 1, in which said box-like body is provided with covers extending forwardly over said pressure-transmitting abutment plate.

PAUL CICIN.